United States Patent
Gregerson

(10) Patent No.: US 7,380,719 B1
(45) Date of Patent: Jun. 3, 2008

(54) BARCODE SCANNER WITH CONFIGURABLE VIDEO MODES

(75) Inventor: David L. Gregerson, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 11/533,905

(22) Filed: Sep. 21, 2006

(51) Int. Cl.
*G06K 7/10* (2006.01)
*G02B 26/00* (2006.01)

(52) U.S. Cl. .................. 235/462.36; 235/462.07; 235/462.37; 235/462.38; 235/462.39; 235/462.4

(58) Field of Classification Search ................ 235/462.01–462.49
See application file for complete search history.

(56) References Cited

U.S. PATENT DOCUMENTS

| | | | | |
|---|---|---|---|---|
| 6,220,513 B1 * | 4/2001 | Blanford et al. | ....... | 235/462.15 |
| 6,293,468 B1 * | 9/2001 | Rantze et al. | ......... | 235/462.25 |
| 6,394,351 B1 * | 5/2002 | Keys et al. | ............ | 235/462.01 |
| 6,497,366 B1 * | 12/2002 | Burkey et al. | ......... | 235/462.25 |
| 6,708,883 B2 * | 3/2004 | Krichever | ............. | 235/462.01 |
| 6,726,094 B1 * | 4/2004 | Rantze et al. | ............... | 235/379 |
| 6,874,688 B1 * | 4/2005 | Barkan | .................. | 235/462.25 |
| 7,178,732 B1 * | 2/2007 | Barron et al. | ......... | 235/462.14 |

* cited by examiner

*Primary Examiner*—Steven S. Paik
*Assistant Examiner*—Christie I Marshall
(74) *Attorney, Agent, or Firm*—Paul W. Martin; Priest & Goldstein, PLLC

(57) ABSTRACT

A barcode scanner with configurable video modes which enhances readability of a wide range of barcode types. The barcode scanner includes a video circuit, and a configuration circuit for altering operating characteristics of the video circuit during a scanning operation for reading a plurality of different types of barcodes.

14 Claims, 3 Drawing Sheets

BARCODE SCANNER WITH CONFIGURABLE VIDEO MODES

BACKGROUND

The video front end circuitry of a barcode scanner is tuned to respond to less-than-perfect signals coming from the laser spot crossing over a barcode label. Barcode label characteristics can vary. For example, barcode density or frequency and print quality may vary. Print quality is affected by overprinting or underprinting, speckles between transitions which create noise, and print intensity or contrast.

A barcode scanner might have several channels where the video circuit in each channel is tuned to optimize the reading with regards to any of the variables previously mentioned. Less expensive barcode scanners with fewer or only one video channel cannot easily be optimized to read different types of barcodes. A barcode scanner with only one video channel has a static circuit which cannot be optimized to read all barcodes that vary widely.

It would be desirable to provide a barcode scanner with configurable video modes in a barcode scanner.

SUMMARY

In accordance with the present invention, a barcode scanner with configurable video modes is provided.

The barcode scanner includes a video circuit, and a configuration circuit for altering operating characteristics of the video circuit during a scanning operation for reading a plurality of different types of barcodes.

DETAILED DESCRIPTION

Figure 1:
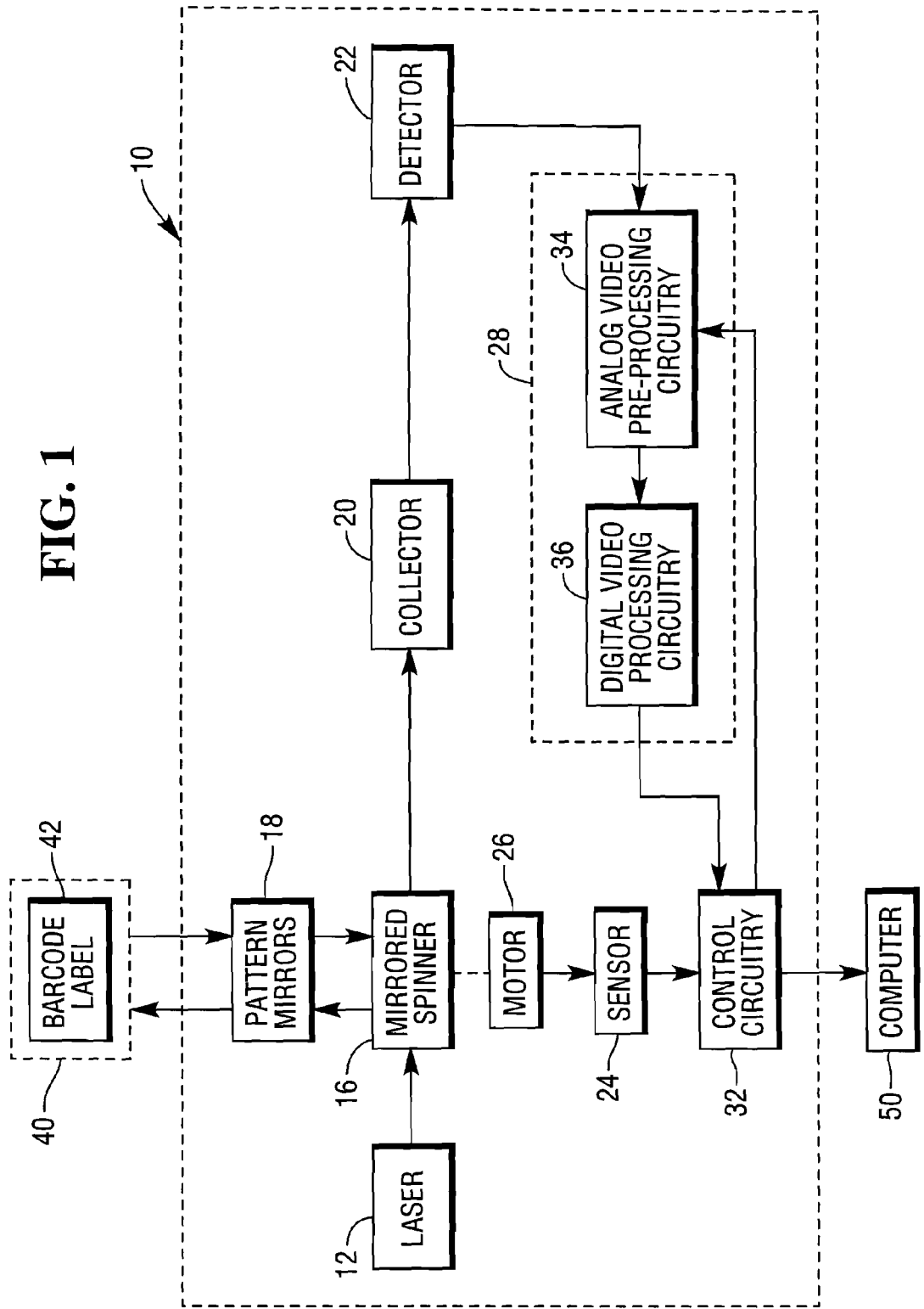
FIG. 1 is a block diagram of an example optical barcode scanner.

With reference to FIG. 1, an example optical scanner 10 includes laser 12, mirrored spinner 16, pattern mirrors 18, collector 20, detector 22, video circuitry 28, and control circuitry 32.

Laser 12 produces a laser beam.

Mirrored spinner 16 directs the laser beam to pattern mirrors 18 and directs light reflected from bar code label 42 to collector 20.

Motor 26 rotates mirrored spinner 16.

Sensor 24 produces a signal for deriving the position of mirrored spinner 16 on its rotational path. Sensor 24 may include a Hall effect device, which produces a fixed number of pulses each time motor 26 rotates one revolution. Sensor 24 sends the pulses to control circuitry 32.

Patter mirrors 18 direct the laser beam towards bar code label 42 and direct the reflected light to mirrored spinner 16.

Collector 20 collects the reflected light and directs it towards detector 22.

Detector 22 converts the reflected light into electrical signals.

Video circuitry 28 extracts barcode data from the electrical signals. Video circuitry 28 includes analog video preprocessing circuitry 34 and digital video processing circuitry 36. Example optical scanner 10 includes only one video channel, but the concepts disclose herein may be applied to scanners with more than one video channel.

Analog video pre-processing circuitry 34 produces analog video signals and sends the signals to digital video processing circuitry 36.

Digital video processing circuitry 36 extracts barcode data from pre-processed signals.

Control circuitry 32 controls operation of scanner 10, decodes barcode data from video circuitry 28, and sends decoded barcode data to computer 50. Control circuitry 32 additional changes the operating characteristics of analog video pre-processing circuitry 34 based upon the position of mirrored spinner 16 and configuration settings 70 in memory 72 (FIG. 2).

Figure 2:
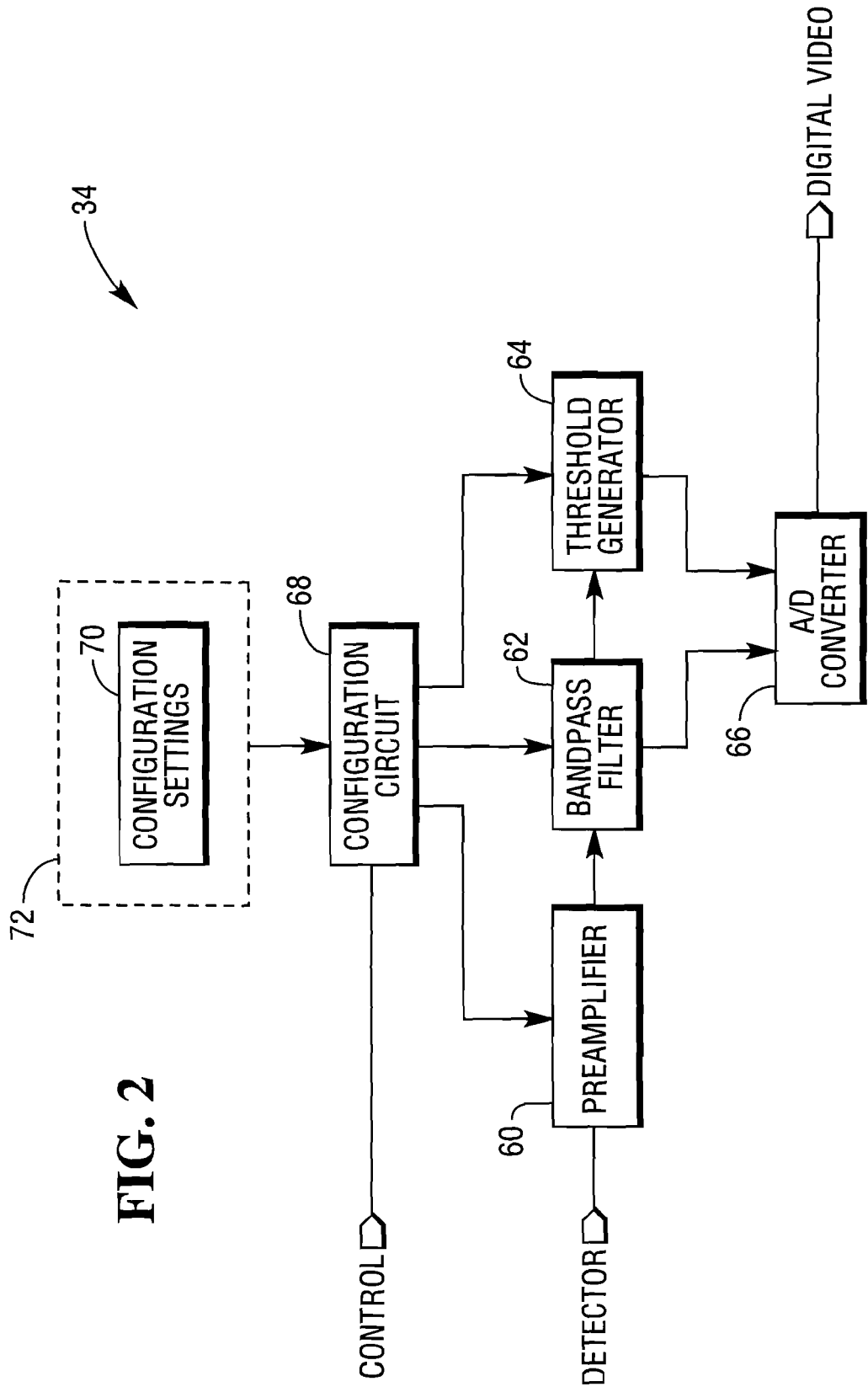
FIG. 2 is a block diagram of an analog video preprocessing circuit in the optical barcode scanner.

Referring now to FIG. 2, analog video pre-processing circuitry 34 is illustrated in further detail.

Analog video pre-processing circuitry 34 includes preamplifier 60, bandpass filter 62, threshold generator 64, analog to digital (A/D) converter 66, and configuration circuit 68.

Preamplifier 60 amplifies the output signal from detector 22.

Bandpass filter 62 filters out frequency extremes.

Threshold generator 64 establishes a comparison threshold level for the filtered analog signal.

Both bandpass filter 62 and threshold generator 64 include passive electronic components. Noise coming from preamplifier 60 must be considered during the design of bandpass filter 62. Several different discrete component values that characterize bandpass filter 62 and threshold generator 64 may be empirically determined.

A/D converter 66 converts the filtered and thresholded analog signal to a digital signal, which is further processed by digital video processing circuitry 36 and ultimately decoded by control circuitry 32.

Configuration circuit 68 alters operating characteristics of analog video pre-processing circuitry 34 in response to a control signal from control circuitry 32. The control signal is based upon spinner position information from position sensor 24. In one example mode of operation, configuration circuit 68 changes the operating characteristics with each revolution of mirrored spinner 16.

Configuration circuit 68 may vary operating characteristics of bandpass filter 62 and thresholds from threshold generator 64 based upon predetermined ranges of barcode densities, contrasts, and print qualities. Configuration settings 70 for different barcode scenarios are stored in memory 72.

Configuration circuit 68 may automatically cycle through all configuration settings 70 during each revolution of mirrored spinner 16, in response to a control signal from control circuitry 32. Thus, scanner 10 may read a wider range of barcode labels during a single scanning movement. As an additional option, configuration circuit 68 may be programmed via script or otherwise to emphasize configuration settings for more popular barcode densities and print qualities during each cycle. For example, configuration circuit 68 may apply the configuration settings for the more popular barcode densities and print qualities twice as often as less popular barcode densities and print qualities.

Figure 3:
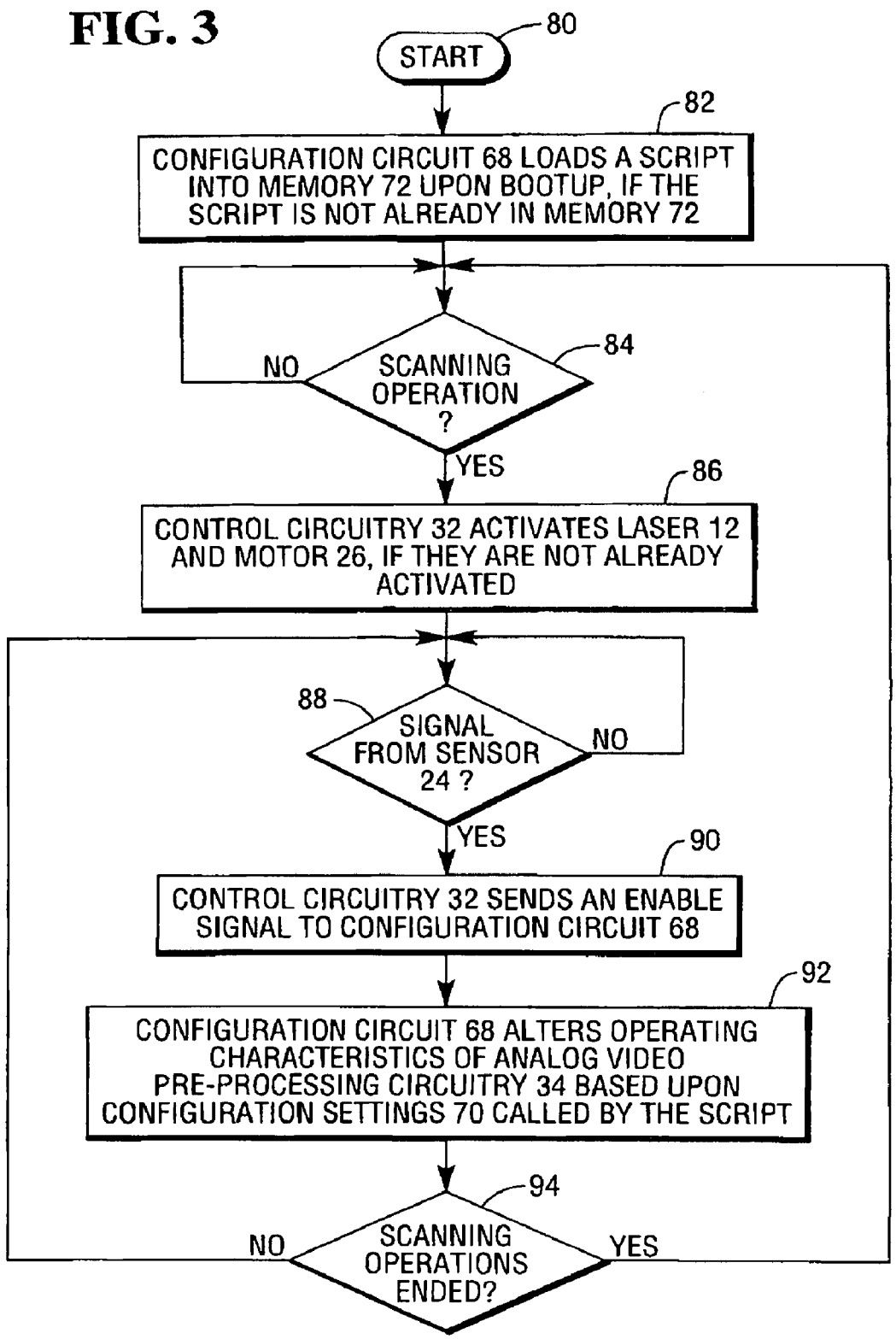
FIG. 3 is a flow diagram illustrating the method of configuring video modes.

With reference to FIG. 3, this example embodiment is illustrated in more detail, beginning with START 80.

In step 82, configuration circuit 68 loads a script into memory 72 upon bootup, if the script is not already in memory 72. Configuration circuit 68 may obtain the script from an attached computer, such as a point-of-sale (POS) terminal, through control circuitry 32.

In step 84, control circuitry 32 waits for a scanning operation. Operation proceeds to step 86 if a scanning operation has begun.

In step 86, control circuitry 32 activates laser 12 and motor 26, if they are not already activated. Control circuitry 32 may activate laser 12 and motor 26 in response to a signal from a sensor in the scanning path.

In step 88, control circuitry 32 waits for a signal from spinner position sensor 24. Following receipt of the signal, operation proceeds to step 90.

In step 90, control circuitry 32 sends an enable signal to configuration circuit 68.

In step 92, configuration circuit 68 reads configuration settings 70 from memory 72 and alters operating characteristics of analog video pre-processing circuitry 34 in accordance with the configuration settings 70. As the script calls for different configuration settings 70, configuration circuit 68 reads the different configuration settings from memory 72 and executes them.

In step 94, control circuitry 32 determines whether all scanning operations have finished. If so, operation returns to step 84. Otherwise, operation proceeds to step 88.

This solution offers a cost-effective approach to providing multiple video front ends in barcode scanner 10. From a performance point of view, barcode scanner 10 can operate on a wider range of barcode densities and print contrast levels.

Although particular reference has been made to certain embodiments, variations and modifications are also envisioned within the spirit and scope of the following claims.

What is claimed is:

1. A barcode scanner comprising:
    a video circuit for detecting and processing scattered light representing a reflection of a laser scan beam from a bar code; and
    a configuration circuit for altering operating characteristics of the video circuit during a scanning operation by cycling the video circuit through a plurality of configuration settings during a single rotation of a mirrored spinner to adapt the video circuit for reading of a plurality of different bar code types for reading a plurality of different types of barcodes.

2. The scanner of claim 1, wherein the video circuit comprises a single channel video circuit.

3. The scanner of claim 1, wherein the configuration circuit executes a script selecting among a plurality of different configuration settings of the video circuit.

4. The scanner of claim 1, wherein the video circuit comprises:
    a bandpass filter; and
    a threshold generator;
    wherein the configuration circuit alters bandpass filter operating characteristics and threshold generator operating characteristics.

5. The scanner of claim 4, wherein the configuration circuit executes a script selecting among a plurality of different configuration settings of the bandpass filter and the threshold generator.

6. The scanner of claim 1, further comprising:
    a mirrored spinner; and
    a sensor for producing a signal identifying a position of the mirrored spinner;
    wherein the configuration circuit alters the operating characteristics of the video circuit in response to the signal from the sensor.

7. A barcode scanner comprising:
    a mirrored spinner;
    a motor for rotating the mirrored spinner;
    a sensor for producing a first signal identifying a position of the mirrored spinner;
    a single channel video circuit including
        a bandpass filter; and
        a threshold generator; and
    a video configuration circuit for altering operating characteristics of the single channel video circuit during a scanning operation for reading a plurality of different types of barcodes by cycling the video circuit through a plurality of configuration settings during a single rotation of a mirrored spinner to adapt the video circuit for reading of a plurality of different bar code types; and
    control circuitry for controlling operation of the motor and for sending a second signal to the video configuration circuit in response to receiving the first signal from the sensor;
    wherein the video configuration circuit executes a script in response to the second signal which selects among a plurality of different configuration settings of the bandpass filter and the threshold generator and alters bandpass filter operating characteristics and threshold generator operating characteristics in accordance with the configuration settings.

8. A scanning method comprising:
    a) altering operating characteristics of a video circuit detecting and processing scattered light representing a reflection of a laser scan beam from a bar code during a scanning operation by cycling the video circuit through a plurality of configuration settings during a single rotation of a mirrored spinner to adapt the video circuit for reading of a plurality of different bar code types; and
    b) reading any of a plurality of different types of barcodes during the scanning operation.

9. The method of claim 8, wherein step a) comprises:
    a-1) determining a plurality of different configuration settings of the video circuit;
    a-2) selecting among the configuration settings during the scanning operation; and
    a-3) implementing selected configuration settings to alter the operating characteristics.

10. The method of claim 8, wherein step a) comprises:
    a-1) determining a plurality of different configuration settings of the video circuit;
    a-2) producing a script identifying selected settings of the different configuration settings; and
    a-3) executing the script to implement the selected settings to alter the operating characteristics.

11. The method of claim 8, wherein step a) comprises:
    a-1) altering operating characteristics of a bandpass filter and a threshold generator of the video circuit during a scanning operation.

12. The method of claim 8, wherein step a) comprises:
    a-1) altering operating characteristics of the video circuit in response to receiving a signal indicative of a position of a mirrored spinner.

13. The method of claim 9, wherein step a-2) comprises:
    a-2) selecting among the configuration settings in response to receiving a signal indicative of a position of a mirrored spinner.

14. The method of claim 10, wherein step a-3) comprises:
    a-3) executing the script in response to receiving a signal indicative of a position of a mirrored spinner.

* * * * *